UNITED STATES PATENT OFFICE.

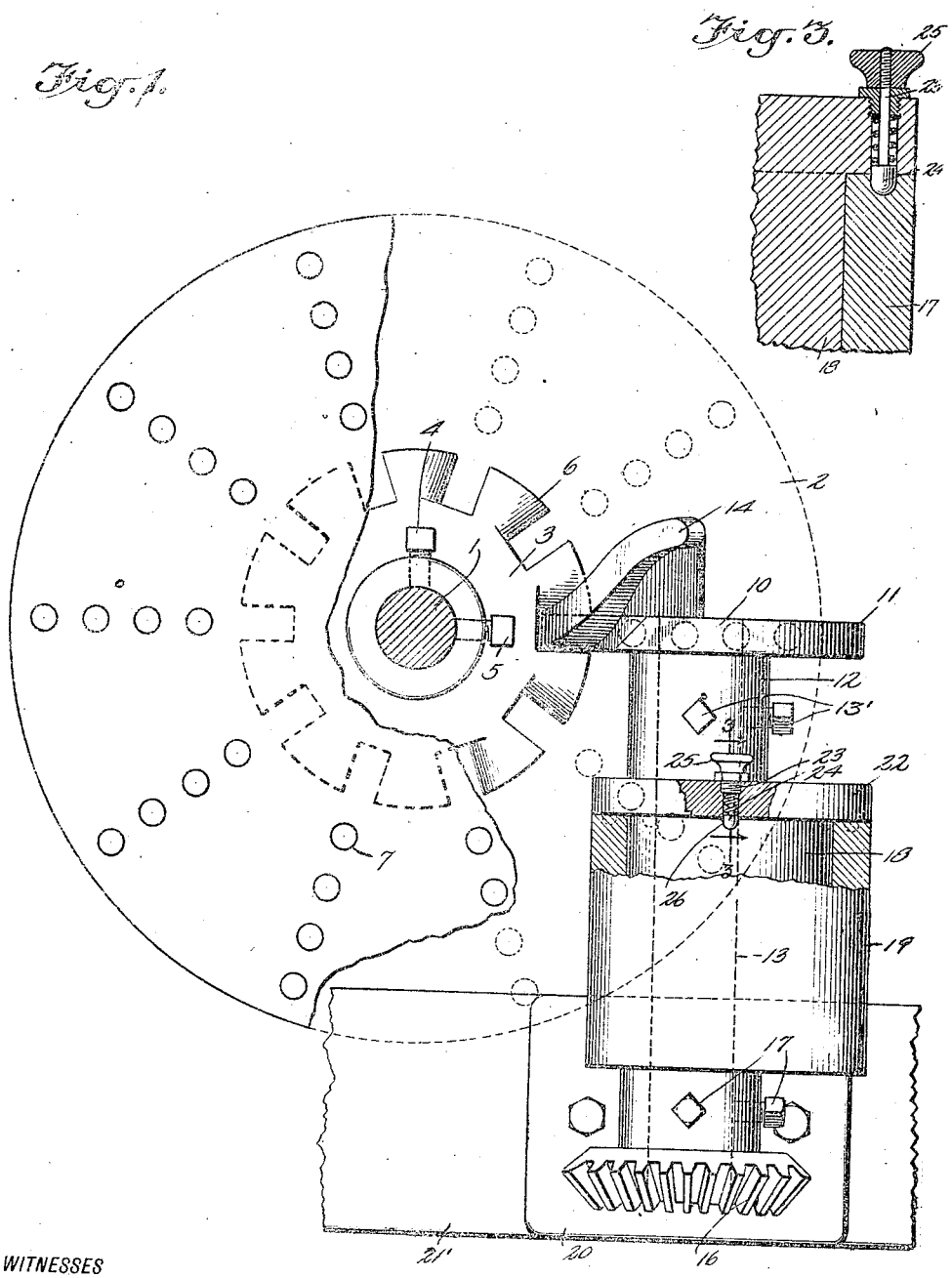

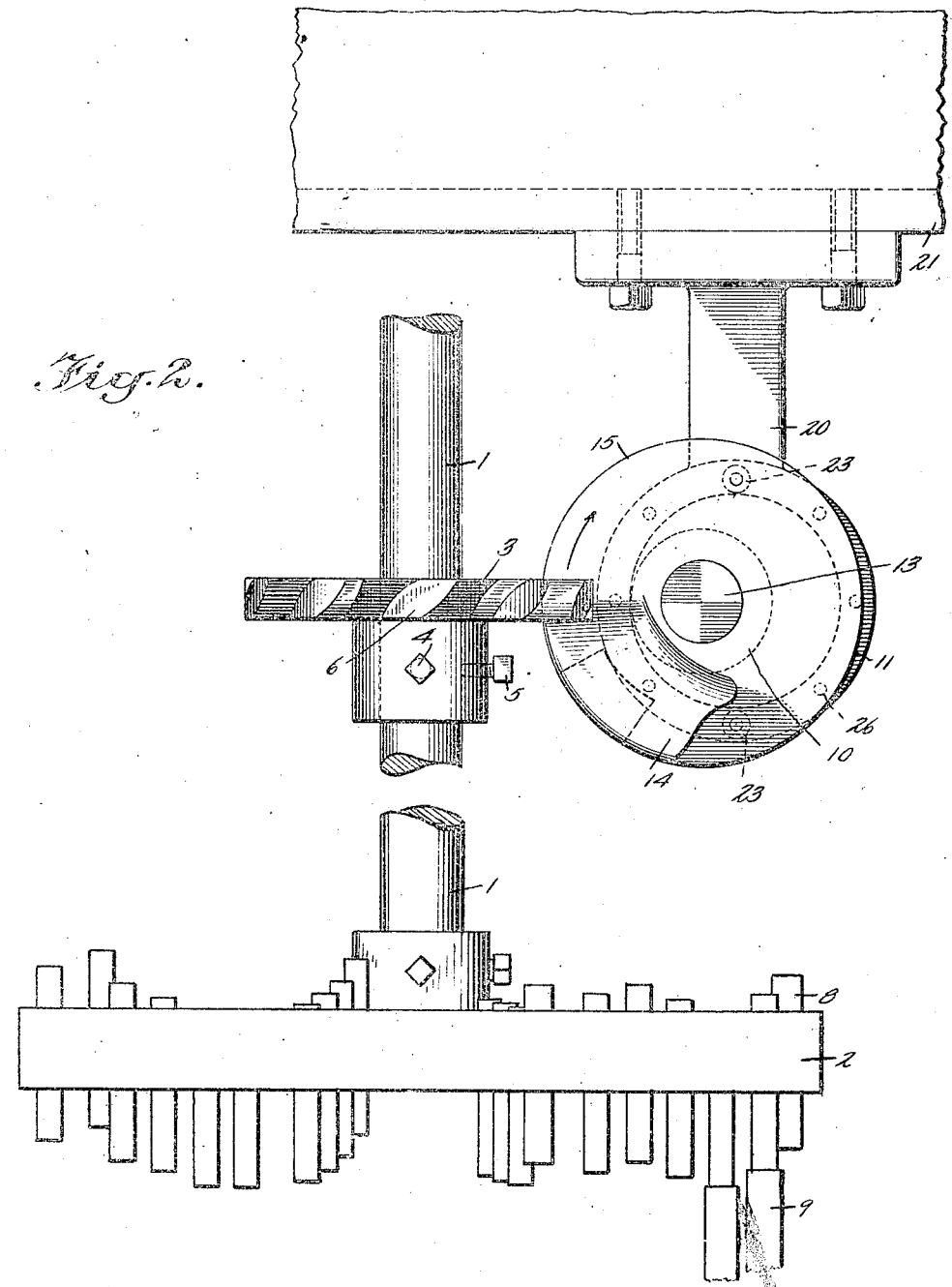

GEORGE CHRISTIAN LOUIS TISCH, OF ELIZABETH, NEW JERSEY, ASSIGNOR TO TISCH MACHINE TOOL AND DIE WORKS, OF ELIZABETH, NEW JERSEY, A CORPORATION OF NEW JERSEY.

JACQUARD MECHANISM.

1,381,034.   Specification of Letters Patent.   Patented June 7, 1921.

Application filed April 29, 1920. Serial No. 377,628.

*To all whom it may concern:*

Be it known that I, GEORGE CHRISTIAN LOUIS TISCH, a citizen of the United States, and a resident of Elizabeth, in the county of Union and State of New Jersey, have invented a new and Improved Jacquard Mechanism, of which the following is a full, clear, and exact description.

This invention relates to a drive for jacquard links and has for an object the provision of an improved construction wherein the jacquard links or members acting as such will be moved accurately in proper time.

Another object of the invention is to provide a drive adapted to be connected to any form of jacquard link wherein the power is transmitted through a form of mutilated worm which will act as driving means for links, also as means for rigidly holding the links in a certain position while the thread carrying bars are being shifted.

Another object of the invention is to provide a drive for jacquard links wherein the parts may be easily adjusted for receiving different sized driving members.

In the accompanying drawing:

Figure 1 is a front elevation of the driving mechanism embodying the invention, a jacquard wheel being shown in dotted lines in connection therewith.

Fig. 2 is a top plan view of the structure of Fig. 1.

Fig. 3 is an enlarged fragmentary detail sectional view through Fig. 1 on line 3—3.

Referring to the accompanying drawings by numeral, 1 indicates the driving shaft for the sprocket wheel associated with an ordinary jacquard link chain or with a special construction 2 which may be called a jacquard wheel. In the present invention, a jacquard link and the immediate connecting parts therefor form no part of the present invention but merely the driving mechanism for the shaft 1 which operates the links of whatever construction. In order to drive the shaft 1 at the proper speed and to hold the same stationary at the proper time, a toothed wheel 3 is provided which is rigidly secured to shaft 1 in any desirable manner, as, for instance, set screws 4 and 5. This wheel is provided with the same number of teeth 6 as is present in the sprocket wheel for driving the jacquard links or the same number of teeth as there are openings 7 where wheel 2 is used. It will be understood that the openings 7 are designed to accommodate the usual pins 8 which act upon the thread guide bars 9 for shifting the same to the correct position as the machine operates. In order to properly rotate the toothed wheel 3, a worm drive 10 is provided, which is formed with a disk 11 having a hub 12 rigidly clamped to the shaft 13 by set screws 13'. Preferably, integrally formed with the plate 11, is a worm member or cam 14 merging into a horizontal flange 15, which in turn merges into plate 11. The cam 14 is of such size that it enters between any two of the teeth 6 and is moved until the teeth straddle the horizontal section 15. The toothed wheel 3 will be moved forward the distance of one tooth and the wheel 2 will be moved forward an equal distance so as to bring to a horizontal position a new set of pins 8. The pins 8 are designed to remain inoperative while the cam 14 is moving the toothed wheel 3, but are adapted to operate while the toothed wheel 3 and the wheel 2 are held rigidly against movement by the horizontal section 15, and in this way the parts are locked in a stationary position while the thread bars are being shifted, and again moved at the proper time when the cam 14 completes its rotation. It will be understood that during the operation of the machine, the cam 14 and plate 11 are rotated continuously at an even speed, the same deriving power from the shaft 13, which in turn receives power from the bevel gear 16. This bevel gear may receive power from any suitable source and is rigidly secured to the shaft 13 by a plurality of set screws 17.

The shaft 13 is provided with an eccentric 18 which may be integral therewith or may be formed separate and rigidly secured thereto in any desired manner. This eccentric is rotatably mounted in a hollow casing 19 provided with a supporting stem 20 which is bolted or otherwise rigidly secured to a suitable support 21. In order to prevent any shifting of the eccentric 18 and, consequently any shifting of member 10, the top plate 22 is provided with one or more catches 23. Plate 22 may be formed integral with the casing 19 or rigidly secured thereto in any desired manner. The catch 23 consists of a spring press plunger 24 having a head 25 which may be grasped and pulled for moving the plunger out of one of the depressions 26 in the eccentric 18. In the drawing two catches 23 are provided, though a greater or even less number may be used without departing from the spirit of the invention. From Fig. 2, it will be noted that the eccentric 18 is provided with eight holes or depressions 26 so that there may be an adjustment of the eccentric and, consequently, a shifting of member 10 toward and from shaft 1. This is desirable when the toothed wheels 3 are changed. If the parts are in the position shown in Figs. 1 and 2, the small toothed wheel 3 is used; whereas, if the parts were in the opposite position, the largest wheel would be used. In this way, a number of sets of pins 8 may be varied as occasion may demand with ease and with the expenditure of a very small amount of time. In the drawing, the eccentric 18 is comparatively small so that only a limited amount of adjustment may be secured thereby, but it will be evident that a larger eccentric could be provided if desired, though, ordinarily, the small eccentric is able to take care of the usual conditions.

The mechanism described is adaptable for use with different kinds of knitting machines where jacquard wheels or jacquard links are used, as for instance, a knitting machine of the type shown in Patent No. 1,134,749, issued April 6, 1915.

What I claim is:

1. The combination with a jacquard mechanism having a plurality of radiating rows of pin receiving openings, of a toothed wheel removably connected with said jacquard mechanism formed with a tooth for each row of pin receiving openings in said jacquard mechanism, a worm member for driving said toothed wheel, a driving shaft for said worm member, means for removably connecting said worm member to said shaft and means for adjusting said shaft toward and from said toothed wheel.

2. The combination with a jacquard mechanism having a plurality of radiating rows of pin receiving openings, of a toothed wheel removably connected with said jacquard mechanism and provided with a tooth for each of said rows of openings, a worm member formed with a flange extending in a plane at right angles to the tooth wheel merging into the worm section of the worm member whereby as the worm member rotates the toothed member and said jacquard mechanism will be held stationary for a given time, said worm section and said worm member advancing said tooth member and said jacquard mechanism at each revolution a distance equal the distance between two rows of openings and means connected with said worm member for rotating the same.

3. In a drive for jacquard mechanism, a shaft, a jacquard mechanism removably connected with said shaft and having radiating rows of openings, a worm wheel removably connected with said shaft, a rotating worm for moving said worm wheel, said worm being mutilated and formed with a flange in the plane of rotation of the worm so as to hold the worm wheel stationary and the jacquard mechanism stationary a given time in proportion to the speed of rotation of the worm, a driving shaft for said worm and means for removably connecting said worm with the driving shaft whereby when the jacquard mechanism is changed to produce another design, said worm and worm wheel may be changed to correspond, said means for adjusting the shaft toward and from the worm wheel permitting different sized worm wheels to be used.

GEORGE CHRISTIAN LOUIS TISCH.